Sept. 28, 1954  L. F. CARY, JR  2,690,155
LIQUID LEVEL INDICATOR
Filed May 12, 1953
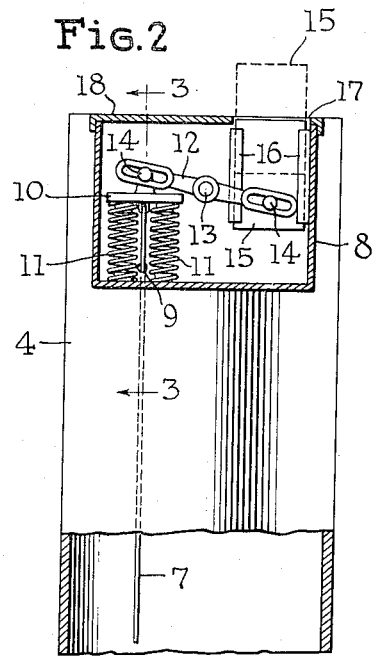
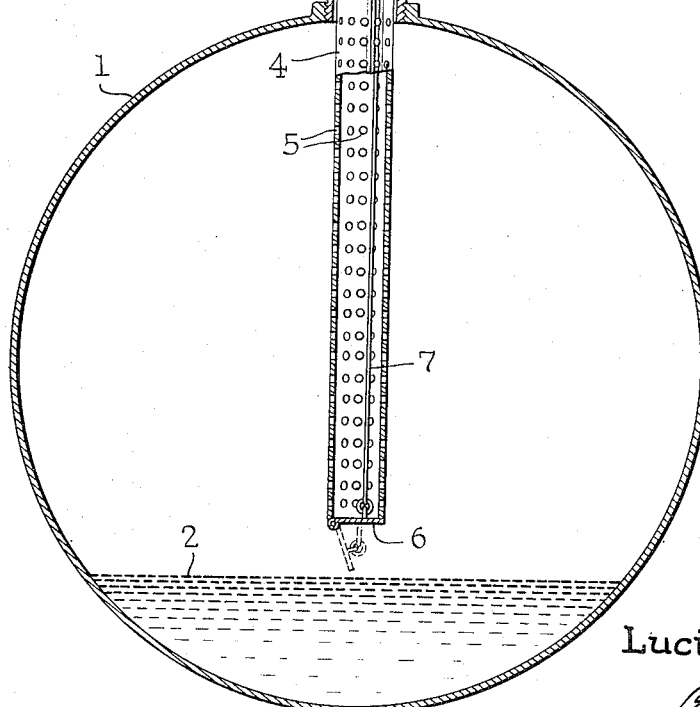
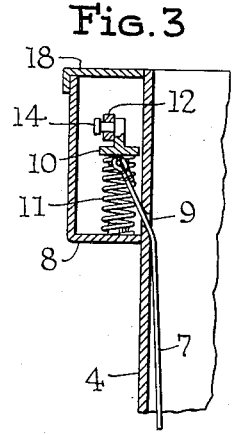
INVENTOR
Lucius F. Cary, Jr.
BY
ATTORNEY Patented Sept. 28, 1954

2,690,155

UNITED STATES PATENT OFFICE 2,690,155

LIQUID LEVEL INDICATOR

Lucius F. Cary, Jr., Richmond, Va.

Application May 12, 1953, Serial No. 354,517

9 Claims. (Cl. 116—118)

This invention relates to a signal means to be used in connection with the filler opening of fuel tanks or the like, for the purpose of indicating to the person filling the tank, when the tank is nearly full, or when a desirable level of fuel oil has been reached.

For the filling of fuel oil tanks, for example, when the tank is underground, or otherwise hidden from the person filling the tank, much difficulty has been experienced from the overflowing of the tank. This overflowing usually occurs because the person making a fuel oil delivery, does not have an adequate signal to warn him when the fuel oil level is approaching the top of the tank. This invention is particularly designed to remedy this difficulty by giving a signal when the fuel level in the tank reaches a predetermined level near to, but short of, the top of the tank.

The object of this invention is to give a positive signal from a tank to indicate when the liquid level is nearing the top of the tank. This signal would enable the person filling the tank to stop the flow of liquid, thereby preventing overflowing of the tank.

Another object of this invention is to provide a simple device of this character, that may be installed in existing tanks.

Another object of this invention is to provide a signal means to prevent the overflowing of fuel tanks that will be simple, durable, compact, efficient, and easy to install.

Further objects and advantages may be seen from the following detailed description taken in connection with the accompanying drawing, in which:

Figure 1 is a sectional view of an underground fuel tank and filler opening with the invention applied thereto;

Figure 2 is an enlarged sectional view of the signal box; and

Figure 3 is an enlarged end sectional view of the signal box, shown in Figure 2, taken along the line 3—3 thereof.

Referring to the drawing, there is shown in Figure 1, an underground fuel oil tank 1, containing fuel oil 2 at a low level. The filler pipe 3 of the tank extends above the ground to give convenient access for filling the tank. Inside the filler pipe 3 a tube 4 is secured, having perforations 5 in its wall, which perforations extend below the point where the tube extends through the upper wall of the tank. Closing the lower end of the perforated tube 4 is a valve 6, and attached to this valve 6 is a wire or cable 7 which extends upwardly inside the tube 4. Attached to the upper end of tube 4 and resting on the top of the filler pipe 3 is a signal box 8.

Referring now to Figures 2 and 3 the cable 7 enters the signal box through the opening 9 and is attached to a vertically movable spring retainer bar 10 that is normally held in the position shown by the spring means 11, as shown in Figure 2. Spring means 11 serve also through the medium of cable 7 to hold the valve 6 in closed position. Lever arm 12, which is pivotally mounted on the pin 13, is also slidably attached by the pins 14 to the bar 10, and a semaphore or other suitable signal 15. The semaphore is mounted for vertical rectilinear movement in the guides 16 and in its uppermost position extends through an opening 17 in the top 18 of the signal box 8.

The device operates as follows. When the fuel is at rest in the tank, i. e. when oil is not being delivered, the hinged valve 6 will be held closed by the biasing action of the spring means 11 acting through the cable 7. In this position the lever arm 12 will hold the semaphore 15 in lowermost position so that it will not be visible. When the tank is being filled with fuel, the fuel entering through the tube 4 will impinge upon the valve 6 with enough force to overcome the bias of the spring means 11 and cause the lever arm 12 to raise the semaphore 15 thereby making the semaphore visible.

As the level of the fuel in the tank rises somewhat above the valve 6, most of the fuel will still be discharged from the tube 4 through the bottom opening, although some fuel will flow through the perforations 5. This will gradually lessen the force on the valve 6, and the spring means 11 will gradually overcome this force and return the signal flag to the inside of the signal box. At a predetermined point near the top of the tank nearly all of the fuel discharging into the tank will be flowing through the perforations 5, the valve 6 will close, and the semaphore 15 will not be visible. At this point the fuel deliveryman will stop the fuel flow. This predetermined cut-off point can be varied for any specific diameter and length of tubing 4 and specific area of perforations 5 by varying or adjusting the spring bias on the valve 6.

While the invention has been described and illustrated with specific embodiments, it will be understood that other embodiments may be resorted to without departing from the invention. For example, the fuel tank does not have to be underground, it may be located in a basement or any other place. When the fuel tank is located in the basement of a house or building so that the filler pipe does not extend vertically, the perforated tube 4 with the valve 6 attached thereto could be connected to the filler pipe so that it extends vertically inside the fuel tank, and the signal box could be attached near the other end of the filler pipe so that it would be outside the house and would be visible to the fuel deliveryman. Also, the signal means, instead of being a visible semaphore, could be some other type of appropriate signal. The spring biasing means could be adjustable either by shortening the flexible cable 7, or by installing adjusting screws on the bottom of the signal box 8, so that the biasing force of the spring 11 may be changed. The device could be built into a new fuel tank by merely extending the filler pipe inside the tank, perforating the portion that is inside the tank, and substituting this perforated filler pipe for the tube 4 and filler pipe 3 shown in the drawing. Obviously, the valve 6 does not have to be a hinged flap valve as shown in the drawing, but could be any known type of valve which would open in response to the flow of the incoming fuel oil.

Other variations within the scope of the appended claims will be apparent to those skilled in the art.

I claim:

1. A liquid level indicating device for use in conjunction with a closed container having a filling opening in the upper portion thereof, comprising: a tubular member extending through the filling opening to the interior of the container, said member having a plurality of perforations in that portion thereof which is positioned within the container; valve means positioned at that end of said tubular member which is within the container, said means being operable to open and substantially close said end to axial liquid flow therethrough; biasing means normally holding said valve means in closed position, said valve and biasing means providing a closure for said end which opens in response to axial liquid flow in said tubular member and gradually closes as the level of liquid rises in said container to divert filling flow outwardly through the perforations in said tubular member; signal means mounted outside said container within visual range of the outer end of said tubular member; and means mechanically connecting said signal means, valve means, and biasing means; whereby an indication is provided of a predetermined level of liquid in said container.

2. A signal device for use in conjunction with a liquid containing tank having a filling opening in the upper portion thereof, comprising: a tubular member extending through the filling opening to the interior of the tank, said tubular member having a plurality of perforations through the side walls of said member in the portion of said member that extends inside said tank; biased valve means normally closing that end of said tubular member that is inside the tank, said valve means opening in response to the filling flow within the tubular member; and a signal means mounted outside said tank and mechanically connected through said biasing means to said valve means; whereby movements of said valve means cause said signal means to indicate when liquid in the tank has reached a predetermined level.

3. A device as defined by claim 1 in which the biasing means comprises spring means.

4. A device as defined by claim 1 in which the signal means includes a slidable semaphore signal.

5. A device as defined by claim 1 in which the container has a filler pipe connected to the container at the filler opening and the tubular member is positioned within said filler pipe.

6. A device as defined by claim 1 in which the signal means is mounted outside said container and on said tubular member.

7. A device as defined by claim 1 in which said signal means comprises a vertically slidable semaphore signal mechanically connected to said biasing means; and said biasing means is connected to said valve means by a flexible cable.

8. A device as defined by claim 1 in which said valve means comprises a flap valve pivotally mounted on the end of said tubular member.

9. A liquid level indicating device for use in conjunction with a closed container which has a filler pipe extending through a filler opening in the upper portion thereof, said indicating device comprising: a tubular member extending through the filler opening and inside the filler pipe into the interior of the container, said tubular member having a plurality of perforations in that portion thereof which extends inside the container; a flap valve pivotally mounted on the lower end of said tubular member; a signal box mounted at the upper end of said filler pipe and having an opening in the upper end thereof; a signal member slidably mounted in said box opposite said opening so as to extend at least partially outside said box in its uppermost position and be received within said box in its lowest position; spring means within said box; a link member within said box pivotally mounted intermediate its ends and pivotally and slidably connected at one end to said signal member and at its other end to said spring means; and a flexible cable connected to said flap valve, extending upwardly through said tubular member and connected at its other end to said spring means; whereby movements of said flap valve serve to control sliding movements of said signal member.

No references cited.